(12) United States Patent
Choi et al.

(10) Patent No.: US 9,991,513 B2
(45) Date of Patent: Jun. 5, 2018

(54) POSITIVE ACTIVE MATERIAL AND LITHIUM SECONDARY BATTERY INCLUDING POSITIVE ELECTRODE THAT INCLUDES THE POSITIVE ACTIVE MATERIAL

(71) Applicant: SAMSUNG SDI CO., LTD., Yongin-si, Gyeonggi-do (KR)

(72) Inventors: Jeonjin Choi, Yongin-si (KR); Minhan Kim, Yongin-si (KR); Joong-Ho Moon, Yongin-si (KR); Haneol Park, Yongin-si (KR); Kyounghyun Kim, Yongin-si (KR); Dohyung Park, Yongin-si (KR); Dongjin Kim, Yongin-si (KR); Gyuran Jeon, Yongin-si (KR); Sun-Ho Kang, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 37 days.

(21) Appl. No.: 15/002,057

(22) Filed: Jan. 20, 2016

(65) Prior Publication Data

US 2016/0211518 A1    Jul. 21, 2016

(30) Foreign Application Priority Data

Jan. 21, 2015   (KR) .................. 10-2015-0010020

(51) Int. Cl.

| | |
|---|---|
| *H01M 4/525* | (2010.01) |
| *H01M 4/505* | (2010.01) |
| *H01M 4/36* | (2006.01) |
| *C01G 53/00* | (2006.01) |
| *H01M 10/052* | (2010.01) |
| *H01M 4/04* | (2006.01) |

(52) U.S. Cl.
CPC ............ *H01M 4/505* (2013.01); *C01G 53/50* (2013.01); *H01M 4/366* (2013.01); *H01M 4/525* (2013.01); *C01P 2002/72* (2013.01); *C01P 2004/54* (2013.01); *C01P 2006/40* (2013.01); *H01M 4/0404* (2013.01); *H01M 4/0409* (2013.01); *H01M 10/052* (2013.01)

(58) Field of Classification Search
CPC .... H01M 10/052; H01M 4/525; H01M 4/505; H01M 4/0404; H01M 4/366; C01G 53/50; C01P 2002/72; C01P 2004/54
See application file for complete search history.

(56) References Cited

U.S. PATENT DOCUMENTS

| | | | | |
|---|---|---|---|---|
| 6,274,270 | B1 * | 8/2001 | Audry | H01M 4/32 429/223 |
| 6,348,284 | B1 * | 2/2002 | Bernard | H01M 4/32 429/206 |
| 6,761,997 | B2 * | 7/2004 | Munakata | H01M 4/505 429/219 |
| 7,122,278 | B1 | 10/2006 | Nakashima et al. | |
| 2004/0157125 | A1 | 8/2004 | Takatsuji et al. | |
| 2007/0218361 | A1 | 9/2007 | Inoue et al. | |
| 2010/0104944 | A1 | 4/2010 | Saito et al. | |

FOREIGN PATENT DOCUMENTS

| | | |
|---|---|---|
| JP | 3236217 B2 | 9/2001 |
| JP | 2007-287661 A | 11/2007 |
| KR | 10-2002-0020686 A | 3/2002 |
| KR | 10-2004-0073350 A | 8/2004 |
| KR | 10-2009-0096534 A | 9/2009 |
| KR | 10-2012-0104821 A | 9/2012 |

* cited by examiner

*Primary Examiner* — Laura Weiner
(74) *Attorney, Agent, or Firm* — Knobbe, Martens, Olson & Bear, LLP

(57) ABSTRACT

A positive active material represented by Formula 1 and a lithium secondary battery having a positive electrode that includes the positive active material are provided:

$$Li_{1-a}A_aNi_xCo_yMn_{1-x-y}O_2 \quad \text{Formula 1}$$

wherein, in Formula 1, A is an alkali metal; $0.0025 \leq a \leq 0.02$; $0.0 < x \leq 1.0$; and $0.0 \leq y \leq 1.0$.

12 Claims, 3 Drawing Sheets

POSITIVE ACTIVE MATERIAL AND LITHIUM SECONDARY BATTERY INCLUDING POSITIVE ELECTRODE THAT INCLUDES THE POSITIVE ACTIVE MATERIAL

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application claims the benefit of Korean Patent Application No. 10-2015-0010020, filed on Jan. 21, 2015, in the Korean Intellectual Property Office, the disclosure of which is incorporated herein in its entirety by reference.

BACKGROUND

Field

The present disclosure relates to a positive active material, and a lithium secondary battery that includes a positive electrode including the positive active material.

Description of the Related Technology

Lithium secondary batteries have high voltage and high energy density, and thus have various applications. Devices such as electric vehicles (REV, PHEV) that may operate at high temperatures, have long-term usability, and may charge or discharge a large amount of electricity require lithium secondary batteries having high-discharge capacity and good lifetime characteristics.

Lithium cobalt oxide having a high energy density per volume is widely used as a positive active material. However, such lithium cobalt oxide costs high due to the use of high-cost cobalt and is not satisfactory in terms of stability and capacity, and thus there still is a need for further improvement in this regard.

SUMMARY

Some embodiments of the present disclosure include a positive active material that is structurally stable.

Some embodiments of the present disclosure include a lithium secondary battery that has an improved initial efficiency, an improved rate capability, and improved lifetime characteristics by using a positive electrode that includes the positive active material.

Additional embodiments will be set forth in part in the description which follows and, in part, will be apparent from the description, or may be learned by practice of the presented embodiments.

According to one or more embodiments of the present disclosure, there is provided a positive active material represented by Formula 1:

Formula 1 wherein, in Formula 1, A is an alkali metal; $0.0025 \le a \le 0.02$; $0.0 < x \le 1.0$; and $0.0 \le y \le 1.0$.

According to one or more embodiments of the present disclosure, a lithium secondary battery includes a positive electrode that includes the above-described positive active material of Formula 1.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
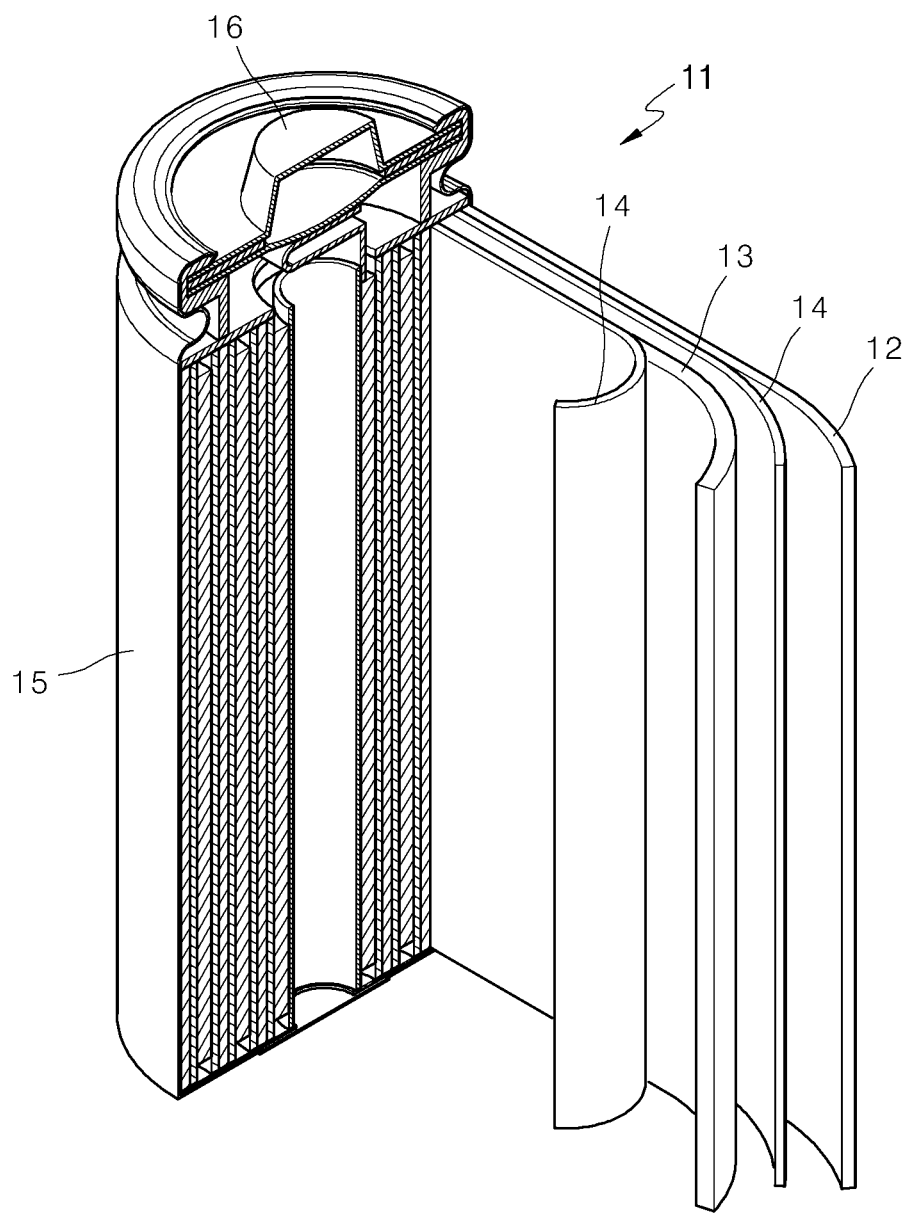
FIG. 1 is a schematic view of a lithium secondary battery according to an embodiment of the present disclosure.

Reference will now be made in detail to embodiments of a positive active material, and a lithium secondary battery that includes a positive electrode including the positive active material, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

According to an aspect of the present disclosure, there is provided a positive active material represented by Formula 1:

Formula 1 wherein, in Formula 1, A is an alkali metal, $0.0025 \le a \le 0.02$, $0.0 < x \le 1.0$, and $0.0 \le y \le 1.0$.

In some embodiments, A in Formula 1 may be sodium (Na), potassium (K), rubidium (Ru), or cesium (Cs).

Lithium cobalt oxide ($LixCoO_2$ (where x=0.05~1.10) is widely used as a positive active material for lithium secondary batteries. However, such lithium cobalt oxide costs high due to the use of high-cost cobalt. The crystalline structure of lithium cobalt oxide used as a positive active material may gradually break down with repeated charging and discharging, hence the (doping) amount of lithium that is intercalatable into and deintercalatable from the lithium cobalt composite oxide may be reduced, and cycle characteristics may be deteriorated.

To address these drawbacks, the present disclosure provides the positive active material represented by Formula 1 as a positive active material with improved structural stability and improved cyclic characteristics by partial substitution of lithium sites with alkali metal, wherein the alkali metal may be, for example, sodium (Na), potassium (K), or cesium (Cs). These alkali metals have a different ionic radius than that of lithium, and thus may distort the crystalline structure of the positive active material when partially substituting for lithium sites. This may prevent the intervention of lithium to breakdown the crystalline structure. Accordingly, the positive active material of Formula 1 may have improved structural stability compared to lithium cobalt oxide, and may improve the initial efficiency, capacity, rate capability, and lifetime characteristics of a lithium secondary battery when used therein.

In the positive active material of Formula 1, a, which indicates a degree of substitution of the alkali metal (A), may be in a range of about 0.0025 to about 0.02. The positive active material of Formula 1 may be structurally stable when a is within this range, and thus a lithium secondary battery with improved cell performance may be manufactured using the positive active material of Formula 1.

In Formula 1, $0.5 \leq x \leq 1.0$, and $0.0 < y \leq 0.5$.

In some embodiments, a in Formula 1 may be 0.0025, 0.0050, 0.01, or 0.02.

In some embodiments, the positive active material of Formula 1 may be selected from $Li_{0.9975}Na_{0.0025}Ni_{0.5}Co_{0.2}Mn_{0.3}O_2$, $Li_{0.9950}Na_{0.0050}Ni_{0.5}Co_{0.2}Mn_{0.3}O_2$, $Li_{0.999}Na_{0.001}Ni_{0.5}Co_{0.2}Mn_{0.3}O_2$, $Li_{0.998}Na_{0.002}Ni_{0.5}Co_{0.2}Mn_{0.3}O_2$, $Li_{0.9975}K_{0.0025}Ni_{0.5}Co_{0.2}Mn_{0.3}O_2$, $Li_{0.9950}K_{0.0050}Ni_{0.5}Co_{0.2}Mn_{0.3}O_2$, $Li_{0.999}K_{0.01}Ni_{0.5}O_{0.2}Mn_{0.3}O_2$, $Li_{0.98}K_{0.02}Ni_{0.5}O_{0.2}Mn_{0.3}O_2$, $Li_{0.9975}Na_{0.0025}Ni_{0.6}Co_{0.2}Mn_{0.2}O_2$, $Li_{0.995}Na_{0.005}Ni_{0.6}Co_{0.2}Mn_{0.2}O_2$, $Li_{0.99}Na_{0.01}Ni_{0.6}Co_{0.2}Mn_{0.2}O_2$, $Li_{0.98}Na_{0.02}Ni_{0.6}Co_{0.2}Mn_{0.2}O_2$, $Li_{0.9975}Na_{0.0025}Ni_{0.8}Co_{0.1}Mn_{0.1}O_2$, $Li_{0.995}Na_{0.005}Ni_{0.8}Co_{0.1}Mn_{0.1}O_2$, $Li_{0.99}Na_{0.01}Ni_{0.8}Co_{0.1}Mn_{0.1}O_2$, and $Li_{0.98}Na_{0.02}Ni_{0.8}Co_{0.1}Mn_{0.1}O_2$.

The composition of the positive active material of Formula 1 may be identified by X-ray diffraction analysis.

In some embodiments, the positive active material of Formula 1 may exhibit diffraction peaks at a Bragg's angle 2θ of about 18° to about 21° and at a 2θ of about 42° to about 47° in X-ray diffraction spectra obtained with Cu-kα radiation. For example, the positive active material of Formula 1 may exhibit a (major) diffraction peak at a 2θ of about 18° to about 21° and a (minor) diffraction peak at a 2θ of about 42° to about 47° in the X-ray diffraction spectra. The term "major" peak used herein refers to a peak having the largest peak intensity.

In some embodiments, according to the X-ray diffraction spectra obtained with Cu-kα radiation, the positive active material may have a ratio (c/a) of lattice constants c to a in a range of about 4.9604 to about 4.9612. The lattice constant "a" may be in a range of about 2.8715 to about 2.8732, and the lattice constant "c" may be in a range of about 14.2428 to 14.2456.

The positive active material of Formula 1 may further include a coating layer on a surface thereof. When the positive active material further including a coating layer on a surface thereof is used in a positive electrode, the positive electrode may have improved charge and discharge characteristics, improved lifetime characteristics, and improved high voltage characteristics.

In some embodiments, the coating layer may include at least one selected from a conductive material, a metal oxide, and an inorganic fluoride.

For example, the conductive material may be at least one selected from a carbonaceous material, a conductive polymer, ITO, $RuO_2$, and ZnO.

For example, the carbonaceous material may be crystalline carbon, amorphous carbon, or a mixture thereof. The crystalline carbon may be graphite, such as natural graphite or artificial graphite that are in amorphous, plate, flake, spherical or fibrous form. The amorphous carbon may be soft carbon (carbon sintered at low temperatures), hard carbon, meso-phase pitch carbides, sintered corks, graphene, carbon black, fullerene soot, carbon nanotubes, and carbon fibers.

Non-limiting examples of the carbonaceous material are carbon nanotubes, fullerene, graphene, and carbon fiber. Non-limiting examples of the conductive polymer are polyaniline, polythiophene, polypyrrole, or a mixture thereof.

For example, the metal oxide may be at least one selected from the group consisting of silica ($SiO_2$), alumina ($Al_2O_3$), zirconium oxide ($ZrO_2$), titanium oxide ($TiO_2$) and a mixture thereof.

For example, the inorganic fluoride may be at least one selected from $AlF_3$, CsF, KF, LiF, NaF, RbF, TiF, AgF, $AgF_2$, $BaF_2$, $CaF_2$, $CuF_2$, $CdF_2$, $FeF_2$, $HgF_2$, $Hg_2F_2$, $MnF_2$, $MgF_2$, $NiF_2$, $PbF_2$, $SnF_2$, $SrF_2$, $XeF_2$, $ZnF_2$, $AlF_3$, $BF_3$, $BiF_3$, $CeF_3$, $CrF_3$, $DyF_3$, $EuF_3$, $GaF_3$, $GdF_3$, $FeF_3$, $HoF_3$, $InF_3$, $LaF_3$, $LuF_3$, $MnF_3$, $NdF_3$, $VOF_3$, $PrF_3$, $SbF_3$, $ScF_3$, $SmF_3$, $TbF_3$, $TiF_3$, $TmF_3$, $YF_3$, $YbF_3$, $TlF_3$, $CeF_4$, $GeF_4$, $HfF_4$, $SiF_4$, $SnF_4$, $TiF_4$, $VF_4$, $ZrF_4$, $NbF_5$, $SbF_5$, $TaF_5$, $BiF_5$, $MoF_6$, $ReF_6$, $SF_6$, and $WF_6$.

In some embodiments, the coating layer may include compound of a coating element selected from the group consisting of oxide, hydroxide, oxyhydroxide, oxycarbonate, and hydroxycarbonate of the coating element. These compounds for the coating layer may be amorphous or crystalline. The coating element for the coating layer may be scandium (Sc), yittrium (Y), niobium (Nb), chromium (Cr), molybdenum (Mo), tungsten (W), manganese (Mn), iron (Fe), boron (B), indium (In), carbon (C), stibium (Sb), lanthanum (La), cerium (Ce), samarium (Sm), gadolinium (Gd), magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), arsenic (As), zirconium (Zr), or mixtures thereof. The coating layer may be formed using any method that does not adversely affect the physical properties of the positive active material when a compound of the coating element is used. For example, the coating layer may be formed using a spray coating method, a dipping method, or the like.

In some embodiments, the coating layer may be a continuous layer or a discontinuous layer, for example, in the form of islands.

Hereinafter, a method of preparing a positive active material of Formula 1 according to an embodiment will be described.

Methods for preparing the positive active material of Formula 1 are not limited, may include, for example, a co-precipitation method, a solid-phase method, and the like.

First, the positive active material of Formula 1 may be prepared using a co-precipitation method as follows.

A positive active material precursor represented by Formula 2 as a positive active material precursor may be mixed with a lithium precursor and an alkali metal source, and then thermally treated at a temperature of about 400° C. to about 1200° C. in the air or oxygen atmosphere to obtain the positive active material represented by Formula 1.

$Ni_xCo_yMn_{1-x-y}(OH)_2$      Formula 2 wherein, in Formula 2, A may be an alkali metal; $0.0025 \leq a \leq 0.002$; $0.0 < x \leq 1.0$; and $0.0 \leq y \leq 1.0$.

For example, the lithium precursor may be lithium carbonate ($Li_2Co_3$), lithium sulfate ($Li_2SO_4$), lithium nitrate ($LiNO_3$), or lithium hydroxide (LiOH). These lithium precursors may be mixed with the positive active material precursor of Formula 2 in a stoichiometric ratio to form the composition of the positive active material represented by Formula 1.

For example, in Formula 2, $0.5 \leq x \leq 1.0$, and $0.0 < y \leq 0.5$.

The alkali metal source may be any material including alkali metal. For example, the alkali metal source may be an alkali metal oxide, an alkali metal hydroxide, an alkali metal carbonate, or an alkali metal nitrate. For example, the alkali metal source may be sodium carbonate, potassium carbonate, or cesium carbonate.

The thermal treatment may be performed at a temperature of about 400° C. to about 1200° C., for example, at a temperature of about 900° C., under the air or oxygen atmosphere. The thermal treatment time may vary depending on the thermal treatment temperature, and may be, for example, in a range of about 5 minutes to about 20 hours.

The positive active material precursor may be obtained as follows. First, a nickel precursor, a manganese precursor, a cobalt precursor, and a solvent may be mixed to obtain a precursor mixture. For example, the solvent may be water or an alcoholic solvent. The alcoholic solvent may be, for example, ethanol.

The amount of the solvent may be in a range of about 200 parts to about 3000 parts by weight based on 100 parts by weight of a total weight of the nickel precursor, manganese precursor, and cobalt precursor. When the amount of the solvent is within this range, the nickel precursor, the manganese precursor, and the cobalt precursor may be uniformly mixed in the precursor mixture. The mixing may be performed at a temperature of about 20° C. to about 80° C., for example, at about 60° C.

The nickel precursor, manganese precursor, and cobalt precursor may be in the form of a salt including metal, such as carbonate, sulfate, nitrate, or chloride.

Non-limiting examples of the manganese precursor are manganese sulfate, manganese nitrate, and manganese chloride. Non-limiting examples of the cobalt precursor are cobalt sulfate, cobalt nitrate, and cobalt chloride. Non-limiting examples of the nickel precursor are nickel sulfate, nickel nitrate, and nickel chloride.

Next, a chelating agent and pH-adjusting agent may be added to the precursor mixture, followed by co-precipitation reaction to obtain a precipitate. The resulting precipitate may be filtered and thermally treated. The thermal treatment may be performed at a temperature of about 20° C. to 110° C., for example, at about 80° C. When the thermal treatment temperature is within these ranges, reactivity of the co-precipitation reaction may be high.

The chelating agent may control the precipitate formation rate during the co-precipitation reaction. The chelating agent may be, for example, ammonium hydroxide ($NH_4OH$). The amount of the chelating agent may be the same as that used in the art.

The pH-adjusting agent may adjust the pH of the reaction mixture to about 6 to about 12. For example, the pH-adjusting agent may be sodium hydroxide (NaOH), sodium carbonate ($Na_2Co_3$), or sodium oxalate ($Na_2C_2O_4$).

For example, the positive active material precursor of Formula 2 may be $Ni_{0.5}Co_{0.2}Mn_{0.3}(OH)_2$.

Hereinafter, a method of preparing a positive active material according to an embodiment by using a solid-phase method will be described. The positive active material of Formula 1 prepared using co-precipitation as described above a solid-phase method may have uniform composition.

First, a nickel precursor, a manganese precursor, and a cobalt precursor may be mixed to obtain a precursor mixture.

The mixing may be mechanically performed using, for example, a ball mill, a banbury mixer, or a homogenizer. The mixing may be performed also using zirconia balls.

The mixing time may vary, for example, may be from about 20 minutes to about 10 hours, and in some other embodiments, from about 30 minutes to about 3 hours.

During the mechanical mixing, an alcoholic solvent such as ethanol may be added to increase mixing efficiency.

The amount of the solvent may be from about 100 parts to about 3000 parts by weight based on 100 parts by weight of a total weight of the nickel precursor, manganese precursor, and cobalt precursor. When the amount of the solvent is within this range, the nickel precursor, the manganese precursor, and the cobalt precursor may be uniformly mixed in the precursor mixture.

Next, the precursor mixture may be thermally treated at a temperature of about 400° C. to about 1200° C. The precursor mixture may be dried through this thermal treatment.

The resulting product may be mixed with a lithium precursor and an alkali metal source, and then thermally treated to obtain the positive active material represented by Formula 1. Examples of the lithium precursor may be the same as those described above in conjunction with the co-precipitation method. The amount of the lithium precursor may be controlled so as to obtain a positive active material having the composition represented by Formula 1.

The thermal treatment may be performed at a temperature of about 400° C. to about 1200° C., and in some embodiments, from about 650° C. to about 900° C., under the air or oxygen atmosphere The thermal treatment time may vary depending on the thermal treatment temperature, for example, may be in a range of about 3 hours to about 20 hours.

The positive active material according to any of the above-described embodiments may be prepared using other common methods, for example, using spray pyrrolysis, in addition to a co-precipitation method and a solid-phase method as described above.

According to another embodiment of the present disclosure, there is provided a positive electrode including a positive active material according to any of the above-described examples.

According to another embodiment of the present disclosure, there is provided a lithium secondary battery including the positive electrode.

The positive electrode may further include, in addition to the positive active material according to any of the above-described embodiments, but not limited to, at least one common positive active material used in the art selected from the group consisting of lithium cobalt oxide, lithium nickel cobalt manganese oxide, lithium nickel cobalt aluminum oxide, lithium iron phosphorous oxide, and lithium manganese oxide.

For example, the at least one common positive active material may be a compound represented by one of the following formulae: $Li_aA_{1-b}B'_bD'_2$ (where $0.90 \leq a \leq 1.8$ and $0 \leq b \leq 0.5$); $Li_aE_{1-b}B'_bO_{2-c}D'_c$ (where $0.90 \leq a \leq 1.8$, $0 \leq b \leq 0.5$, and $0 \leq c \leq 0.05$); $LiE_{2-b}B'_bO_{4-c}D'_c$ (where $0 \leq b \leq 0.5$ and $0 \leq c \leq 0.05$); $Li_aNi_{1-b-c}Co_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_2$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$, and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A is selected from the group consisting of nickel (Ni), cobalt (Co), manganese (Mn), and combinations thereof; B' is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D' is selected from the group consisting of oxygen (O), fluorine (F), sulfur (S), phosphorus (P), and combinations thereof; E is selected from the group consisting of cobalt (Co), manganese (Mn), and combinations thereof; F' is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; I' is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof.

For example, the at least one common positive active material may be one selected from compounds represented by Formulae 3 to 6.

$$Li_aNi_bCo_cMn_dO_2 \qquad \text{Formula 3}$$

wherein, in Formula 3, $0.90 \leq a \leq 1.8$, $0 \leq b \leq 0.9$, $0 \leq c \leq 0.5$, and $0 \leq d \leq 0.9$.

$$Li_2MnO_3 \qquad \text{Formula 4}$$

$$LiMO_2 \qquad \text{Formula 5}$$

wherein, in Formula 5, M may be Mn, Fe, Co, or Ni.

In some embodiments, the positive electrode may be manufactured as follows.

First, a positive active material of Formula 1, a binder, and a solvent may be mixed to prepare a positive active material composition. A conducting agent may be further added into the positive active material composition.

The positive active material composition may be directly coated on a metallic current collector and dried to prepare a positive electrode plate. Alternatively, the positive active material composition may be cast on a separate support to form a positive active material film, which may then be separated from the support and laminated on a metallic current collector to prepare a positive electrode plate.

The positive active material may be a positive active material of Formula 1 according to any of the above-described embodiment.

In some embodiments, the positive electrode may further include a first positive active material as a common positive active material used for lithium secondary batteries in the art, in addition to the positive active material of Formula 1.

The first positive active material may include at least one selected from the group consisting of lithium cobalt oxide, lithium nickel cobalt manganese oxide, lithium nickel cobalt aluminum oxide, lithium iron phosphorous oxide, and lithium manganese oxide, but is not limited thereto.

Non-limiting examples of the conducting agent in the positive active material composition are carbon black, graphite particulates, natural graphite, artificial graphite, acetylene black, ketjen black, carbon fibers; metallic materials including copper, nickel, aluminum, silver, or the like in powder, fiber, or tubular form; and conductive polymers such as polyphenylene derivatives.

Non-limiting examples of the binder are a vinylidene fluoride/hexafluoropropylene copolymer, polyvinylidene fluoride (PVDF), polyimide, polyethylene, polyester, polyacrylonitrile, polymethylmethacrylate, polytetrafluoroethylene (PTFE), a carboxymethyl cellulose-styrene-butadiene rubber (SMC/SBR) copolymer, a styrene butadiene rubber polymer, or a mixture thereof.

Non-limiting examples of the solvent include N-methylpyrrolidone (NMP), acetone, and water.

The amounts of the positive active material, the conducting agent, the binder, and the solvent may be those levels that are generally used in the manufacture of lithium secondary batteries in the art. At least one of the conducting agent, the binder, and the solvent may be omitted depending on the use and the structure of the lithium secondary battery.

A negative electrode of the lithium secondary battery may be manufactured in a substantially same manner as in the manufacture of the positive electrode, except for using a negative active material instead of a positive active material.

The negative active material may be a carbonaceous material, silicon, a silicon oxide, a silicon-based alloy, a silicon-carbonaceous material composite, tin, a tin-based alloy, a tin-carbon composite, a metal oxide, or a combination thereof.

The carbonaceous material may be crystalline carbon, amorphous carbon, or a mixture thereof. The crystalline carbon may be graphite, such as natural graphite or artificial graphite that are in amorphous, plate, flake, spherical or fibrous form. The amorphous carbon may be soft carbon (carbon sintered at low temperatures), hard carbon, mesophase pitch carbides, sintered corks, graphene, carbon black, fullerene soot, carbon nanotubes, and carbon fibers.

The negative active material may be selected from the group consisting of Si, Si (where $0<x<2$, for example, $0.5<x<1.5$), Sn, $SnO_2$, a silicon-containing metal alloy, and a mixture thereof. The metal that is alloyable with silicon may be at least one selected from Al, Sn, Ag, Fe, Bi, Mg, Zn, In, Ge, Pb, and Ti.

The negative active material may include a metal/metalloid alloyable with lithium, an alloy thereof, or an oxide thereof. Examples of the metal/metalloid alloyable with lithium are Si, Sn, Al, Ge, Pb, Bi, Sb, a Si—Y alloy (where Y is an alkali metal, an alkali earth metal, a Group 13 element, a Group 14 element, a transition metal, a rare earth element, or a combination thereof except for Si), a Sn—Y alloy (where Y is an alkali metal, an alkali earth metal, a Group 13 element, a Group 14 element, a transition metal, a rare earth element, or a combination thereof except for Sn), and MnO (where $0<x\leq2$). Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or combinations thereof. Non-limiting examples of the oxide of the metal/metalloid alloyable with lithium are a lithium titanium oxide, a vanadium oxide, a lithium vanadium oxide, $SnO_2$, and $SiO_x$ (where $0<x<2$).

For example, the negative active material may include at least one element selected from the group consisting of the elements of Groups 13, 14, and 15 of the periodic table of elements.

For example, the negative active material may include at least one element selected from the group consisting of Si, Ge, and Sn.

The amounts of the negative active material, the conducting agent, the binder, and the solvent may be those levels that are generally used in the manufacture of lithium secondary batteries in the art. Examples of the conducting agent, binder, and solvent for the negative electrode may be the same as those used in the manufacture of the positive electrode.

The separator may be disposed between the positive electrode and the negative electrode. For example, the separator may be an insulating thin film having high ion permeability and high mechanical strength.

The separator may have a pore diameter of about 0.01 µm to about 10 µm, and a thickness of about 5 µm to about 20 µm. Non-limiting examples of the separator are olefin-based polymers, such as polypropylene, and sheets or non-woven fabric made of glass fiber or polyethylene. When a lithium secondary battery includes a solid polymer electrolyte, the solid polymer electrolyte may also serve as the separator.

The separator may be a monolayer or a multilayer including at least two layers of polyethylene, polypropylene, polyvinylidene fluoride, or a combination thereof. The multilayer may be a mixed multilayer. For example, the separator may be a two-layered separator including polyethylene and polypropylene layers, a three-layered separator including polyethylene, polypropylene and polyethylene layers, or a three-layered separator including polypropylene, polyethylene and polypropylene layers.

The lithium salt-containing nonaqueous electrolyte may include a nonaqueous electrolyte and a lithium salt.

The nonaqueous electrolyte may be a nonaqueous liquid electrolyte, an organic solid electrolyte, or an inorganic solid electrolyte.

The nonaqueous liquid electrolyte may include an organic solvent. For example, the organic solvent may be propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, chloroethylene carbonate, benzonitrile, acetonitrile, tetrahydrofuran, 2-methyltetrahydrofuran, γ-butyrolactone, dioxorane, 4-methyldioxorane, N,N-dimethyl formamide, N,N-dimethyl acetamide, N,N-dimethylsulfoxide, dioxane, 1,2-dimethoxyethane, sulforane, dichloroethane, chlorobenzene, nitrobenzene, diethylene glycol, dimethyl ether, or a mixture thereof.

Non-limiting examples of the organic solid electrolyte are polyethylene derivatives, polyethylene oxide derivatives, polypropylene oxide derivatives, phosphoric acid ester polymer, polyester sulfide, polyvinyl alcohol, polyfluoride vinylidene, and polymers including ionic-dissociative groups.

Non-limiting examples of the inorganic solid electrolyte are nitrides, halides, and sulfates of lithium, such as $Li_3N$, $LiI$, $Li_5NI_2$, $Li_3N-LiI-LiOH$, $Li_2SiS_3$, $Li_4SiO_4$, $Li_4SiO_4-LiI-LiOH$, and $Li_3PO_4-Li_2S-SiS_2$.

The lithium salt may be a material that is dissoluble in a non-aqueous electrolyte, for example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), $LiCl$, $LiI$, or a mixture thereof. To improve charge-discharge characteristics and resistance to flame in the lithium secondary battery, pyridine, triethylphosphate, triethanolamine, cyclic ether, ethylene diamine, n-glyme, hexamethyl phosphoramide, nitrobenzene derivative, sulfur, a quinone imine dye, N-substituted oxazolidinone, N, N-substituted imidazolidine, ethylene glycol dialkyl ether, an ammonium salt, pyrrole, 2-methoxyethanol, or aluminum trichloride may be added to the nonaqueous electrolyte. In some embodiments, to provide nonflammable characteristics, a halogen-containing solvent such as carbon tetrachloride, ethylene trifluoride, or the like may be further added to the nonaqueous electrolyte, if required.

Referring to FIG. 1, a lithium secondary battery 11 according to an embodiment of the present disclosure may include a positive electrode 13, a negative electrode 12, and a separator 14. The positive electrode 13, the negative electrode 12 and the separator 14 may be wound or folded, and then sealed in a battery case 15. Subsequently, the battery case 15 may be filled with an organic electrolyte and sealed with a cap assembly 16, thereby completing the manufacture of the lithium secondary battery 11. The battery case 15 may be a cylindrical type, a rectangular type, or a thin-film type. For example, the lithium secondary battery 11 may be a thin film type battery. The lithium secondary battery 11 may be a lithium ion battery.

In some embodiments, a bi-cell structure as a stack of two battery assemblies may be formed and impregnated with an organic electrolyte. The resultant may then be put into a pouch and sealed, thereby completing the manufacture of a lithium ion polymer battery.

In some other embodiments, a plurality of battery assemblies may be stacked upon one another to form a battery pack, which may be used in any devices that operate at high temperatures and require high output, for example, in a laptop computer, a smart phone, an electric vehicle, and the like.

Hereinafter, one or more embodiments of the present disclosure will be described in detail with reference to the following examples and comparative examples. However, the examples are presented for illustrative purposes only and these examples are not intended to limit the scope of the disclosure.

Example 1: Preparation of Positive Active Material

Nickel sulfate as a nickel precursor, cobalt sulfate as a cobalt precursor, and manganese sulfate as a manganese precursor were mixed with water and ammonia water to obtain a metal precursor mixture. The amounts of nickel sulfate, cobalt sulfate, and manganese sulfate were adjusted to reach a mole ratio of about 5:2:3 of nickel, cobalt, and manganese.

The metal precursor mixture was stirred at about 600 rpm while the temperature was maintained at about 50° C. A sodium hydroxide solution was automatically added to the metal precursor mixture to a pH of about 11.2 by using a pH controller.

A precipitate was obtained from the resulting product and then washed with pure water and dried, thereby preparing a positive active material precursor ($Ni_{0.5}Co_{0.2}Mn_{0.3}(OH)_2$).

The positive active material precursor ($Ni_{0.5}Co_{0.2}Mn_{0.3}(OH)_2$) was mixed with lithium carbonate and sodium carbonate, followed by adding water and mixing together to obtain a positive active material composition. A mixing ratio of the positive active material precursor, lithium carbonate, and sodium carbonate was stoichiometrically controlled so as to obtain a positive active material having a target composition ($Li_{0.9975}Na_{0.0025}Ni_{0.5}Co_{0.2}Mn_{0.3}O_2$). The amount of sodium carbonate was about 0.25 mole %.

The positive active material composition was thermally treated at about 800° C. under an oxidative gas atmosphere including about 20 vol. % of oxygen and about 80 vol. % of nitrogen to obtain the target positive active material ($Li_{0.9975}Na_{0.0025}Ni_{0.5}Co_{0.2}Mn_{0.3}O_2$).

Example 2

A positive active material ($Li_{0.995}Na_{0.005}Ni_{0.5}Co_{0.2}Mn_{0.3}O_2$) was prepared in the same manner as in Example 1, except that the amount of sodium carbonate was varied to about 0.50 mole %.

Example 3

A positive active material ($Li_{0.999}Na_{0.01}Ni_{0.5}Co_{0.2}Mn_{0.3}O_2$) was prepared in the same manner as in Example 1, except that the amount of sodium carbonate was varied to about 1.0 mole %.

Example 4

A positive active material ($Li_{0.998}Na_{0.02}Ni_{0.5}Co_{0.2}Mn_{0.3}O_2$) was prepared in the same manner as in Example 1, except that the amount of sodium carbonate was varied to about 2.0 mole %.

Comparative Example 1

A positive active material ($LiNi_{0.5}Co_{0.2}Mn_{0.3}O_2$) was prepared in the same manner as in Example 1, except that sodium carbonate was not used in preparing the positive active material composition.

Comparative Example 2

A positive active material ($Li_{0.9985}Na_{0.0015}Ni_{0.5}Co_{0.2}Mn_{0.3}O_2$) was prepared in the same manner as in Example 1, except that the amount of sodium carbonate was varied to about to 0.15 mole %.

Comparative Example 3

A positive active material ($Li_{0.995}Na_{0.05}Ni_{0.5}Co_{0.2}Mn_{0.3}O_2$) was prepared in the same manner as in Example 1, except that the amount of sodium carbonate was varied to about 5.0 mole %.

Manufacture Example 1: Manufacture of Lithium Secondary Battery (Coin Cell)

A lithium secondary battery as a coin cell was manufactured as follows using the positive active material (lithium cobalt oxide) of Example 1.

The positive active material of Example 1, polyvinylidene fluoride (PVDF), and carbon black as a conducting agent were mixed together using a mixer, followed by degassing to prepare a uniformly dispersed positive active material slurry. A mixed ratio of the positive active material, PVDF, and carbon black was about 92:2:2 by weight. N-methylpyrrolidone as a solvent was added to the positive active material slurry.

The positive active material slurry was coated on an aluminum foil by using a doctor blade to form a thin electrode plate, which was then dried at about 135° C. for about 3 hours or longer, followed by pressing and vacuum drying to manufacture a positive electrode.

The positive electrode and a lithium metal as a counter electrode were assembled into a coin cell (2032 type), with a porous polyethylene (PE) film separator (having a thickness of about 16 μm) disposed between the positive electrode and the lithium metal counter electrode, followed by injecting an electrolyte, thereby completing the manufacture of the coin cell.

The electrolyte was a solution of 1.1 M $LiPF_6$ dissolved in a solvent mixture of ethylene carbonate (EC), ethyl methyl carbonate (EMC) and dimethyl carbonate (DMC) in a volume ratio of about 3:4:3.

Manufacture Examples 2 to 4

Coin cells were manufactured in the same manner as in Manufacture Example 1, except that the positive active materials of Examples 2 to 4 were used, respectively, instead of the positive active material of Example 1.

Comparative Manufacture Examples 1-3

Coin cells were manufactured in the same manner as in Manufacture Example 1, except that the positive active materials of Comparative Examples 1 to 3 were used, respectively, instead of the positive active material of Example 1.

Evaluation Example 1: Charge-Discharge Characteristics

Charge-discharge characteristics of the coin cells of Manufacture Examples 1 to 4 and Comparative Manufacture Examples 1 to 3 were evaluated using a charger/discharger (TOYO-3100, available from TOYO Co., Tokyo, Japan). The results are shown in Table 1.

Each of the coin cells of Manufacture Examples 1 to 4 and Comparative Manufacture Examples 1 to 3 were subjected to one cycle of charging and discharging at a 0.1 C rate (formation process), followed by one cycle of charging and discharging at 0.2 C, 0.333 C, and 0.5 C, respectively. Afterward, initial charge-discharge characteristics of the coin cells were evaluated. After further 50 cycles of charging and discharging at a 1 C rate, cycle characteristics thereof were evaluated. The charging was set to start in a constant current (CC) mode, and then be shifted to a constant voltage (CV) mode to cut off at 0.01 C, and the discharging was set to cut off at 1.5V in a CC mode.

(1) Initial Charge-Discharge Efficiency

Initial charge-discharge efficiencies of the coin cells were calculated using Equation 1:

Initial charge-discharge efficiency (%)=[$1^{st}$ cycle discharge capacity/$1^{st}$ cycle charge capacity]×100      Equation 1

(2) Initial Charge and Discharge Capacities

Charge capacity and discharge capacities at the $1^{st}$ cycle were measured.

TABLE 1

| Example | Charge capacity (mAh/g) | Discharge capacity (mAh/g) | Initial charge-discharge efficiency (%) |
|---|---|---|---|
| Manufacture Example 1 | 191.7 | 170.1 | 88.7 |

TABLE 1-continued

| Example | Charge capacity (mAh/g) | Discharge capacity (mAh/g) | Initial charge-discharge efficiency (%) |
|---|---|---|---|
| Manufacture Example 2 | 190.3 | 169.2 | 88.9 |
| Manufacture Example 3 | 191.5 | 168.6 | 88.1 |
| Manufacture Example 4 | 190.6 | 167.9 | 88.1 |
| Comparative Manufacture Example 1 | 190.4 | 164.3. | 86.3 |
| Comparative Manufacture Example 2 | 193.8 | 167.1 | 86.2 |
| Comparative Manufacture Example 3 | 193.1 | 158.1 | 81.9 |

Referring to Table 1, the coin cells of Manufacture Examples 1 to 3 were surprisingly found to have improved initial charge and discharge capacities and improved initial charge-discharge efficiencies, compared to the coin cells of Comparative Manufacture Examples 1 to 3.

Evaluation Example 2: Evaluation of Rate Capability

The coin cells of Manufacture Examples 1 to 4 and Comparative Manufacture Examples 1 to 3 were each charged at a constant current of 0.1 C and a constant voltage of 1.0 V (0.01 C cut-off), followed by a rest for about 10 minutes and discharging at a constant current of 0.2 C, 0.333 C, 0.5 C, or 1 C to a cut-off voltage of 2.5V. In other words, the rate capabilities of the coin cells were evaluated while varying the discharge rate to 0.2 C, 0.333 C, 0.5 C, or 1 C. The results are shown in Table 2.

The discharge capabilities in Table 2 were obtained by calculation using Equation 2.

Rate capability (%)={(Discharge capacity of cell at 1 C/(Discharge capacity of cell at 0.1 C)}*100   Equation 2

TABLE 2

| Example | Discharge capacity (@0.2 C) (mAh/g) | Discharge capacity (@0.333 C) (mAh/g) | Discharge capacity (@0.5 C) (mAh/g) | Discharge capacity (@1 C) (mAh/g) | Rate capability (1 C/0.1 C) (%) |
|---|---|---|---|---|---|
| Manufacture Example 1 | 165.5 | 161.8 | 158.5 | 152.2 | 89.5 |
| Manufacture Example 2 | 163.8 | 159.4 | 155.8 | 149.2 | 88.2 |
| Manufacture Example 3 | 163.4 | 158.9 | 155.5 | 149.0 | 88.4 |
| Manufacture Example 4 | 160.0 | 155.0 | 151.7 | 146.5 | 87.2 |
| Comparative Manufacture Example 1 | 159.0 | 153.5 | 149.8 | 143.1 | 87.1 |
| Comparative Manufacture Example 2 | 156.7 | 151.2 | 147.6 | 140.9 | 84.3 |
| Comparative Manufacture Example 3 | 149.0 | 143.5 | 138.8 | 131.6 | 83.2 |

Referring to Table 2, the coin cells of Manufacture Examples 1 to 4 were surprisingly found to have improved high-rate discharge characteristics, compared to those of the coin cells of Comparative Manufacture Examples 1 to 3. The expression "improved high-rate discharge characteristics" used herein means that a reduction rate in normalized capacity (i.e., capacity retention rate) becomes low with an increased discharge rate (C-rate). The improved high-rate discharge characteristics in the coin cells of Manufacture Examples 1 to 4 are attributed to the fact that partial substitution of lithium with sodium having a different ionic diameter from that of lithium leads to appropriate distortion in the crystalline structure of the positive active material, which consequentially prevents the intervention of lithium to breakdown the crystalline structure and improves cyclic performance of the lithium secondary batteries.

Evaluation Example 3: Lifetime Characteristics

Charge-discharge cycling was performed on the coin cells of Manufacture Examples 1 to 4 and Comparative Manufacture Examples 1 to 3 at about 25° C. In particular, charging each coin cell at a constant current (CC) of 0.1 C to a voltage of 4.7V was followed by discharging at a constant current of 0.1 C to about 2.5V.

After repeating this charge-discharge cycle 60 times, the capacity retention rate of each coin cell was calculated using Equation 3. The $1^{st}$ cycle discharge capacity in Equation 3 refers to the initial discharge capacity.

Capacity retention rate (%)=(50th cycle discharge capacity/1st cycle discharge capacity)*100   Equation 3

The capacity retention rates of the coin cells evaluated as described above are shown in FIG. 2.

Figure 2:
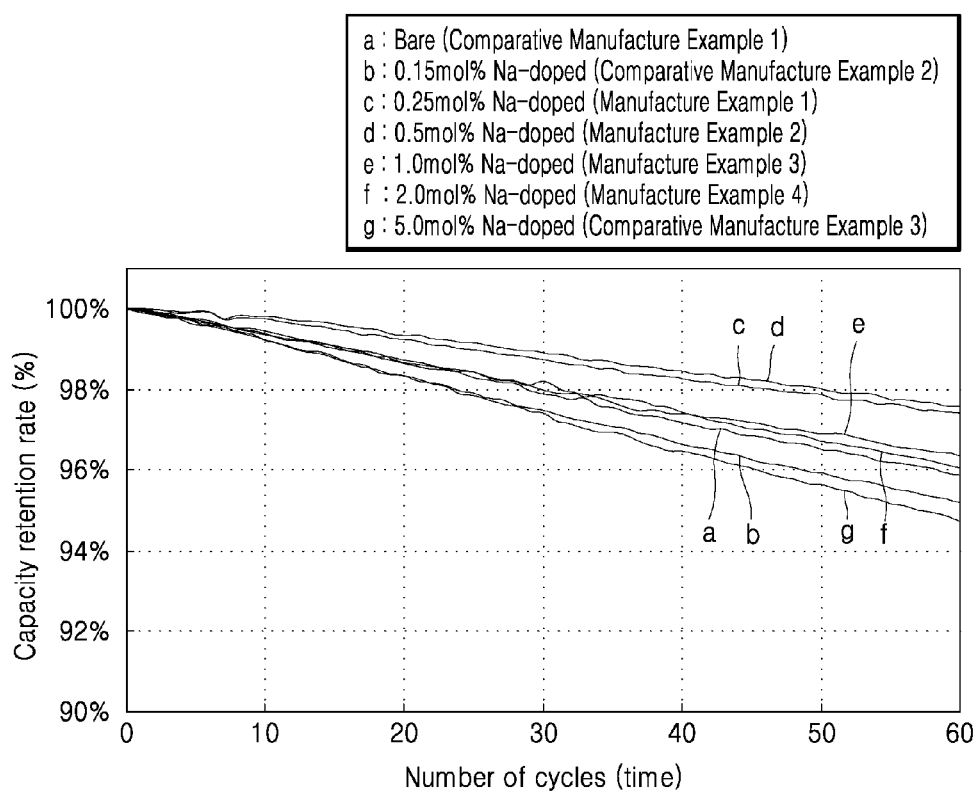
FIG. 2 is a graph illustrating lifetime characteristics of coin cells of Manufacture Examples 1 to 4 and Comparative Manufacture Examples 1 to 3.

Referring to FIG. 2, the coin cells of Manufacture Examples 1 to 4 were surprisingly found to have improved capacity retention rates, compared to the coin cells of Comparative Manufacture Examples 1 to 3.

Evaluation Example 4: X-Ray Diffraction (XRD) Analysis

The positive active materials prepared in Examples 1 to 4 and Comparative Examples 1 to 3 were analyzed by X-ray diffraction (XRD) analysis with CuKα radiation.

In particular, the positive active materials were structurally analyzed by powder XRD using a Rigaku RINT2200HF+ diffractometer (Rigaku Corporation) with CuKα radiation (1.540598 Å) at a scan rate of about 0.02°/1 sec.

Figure 3:
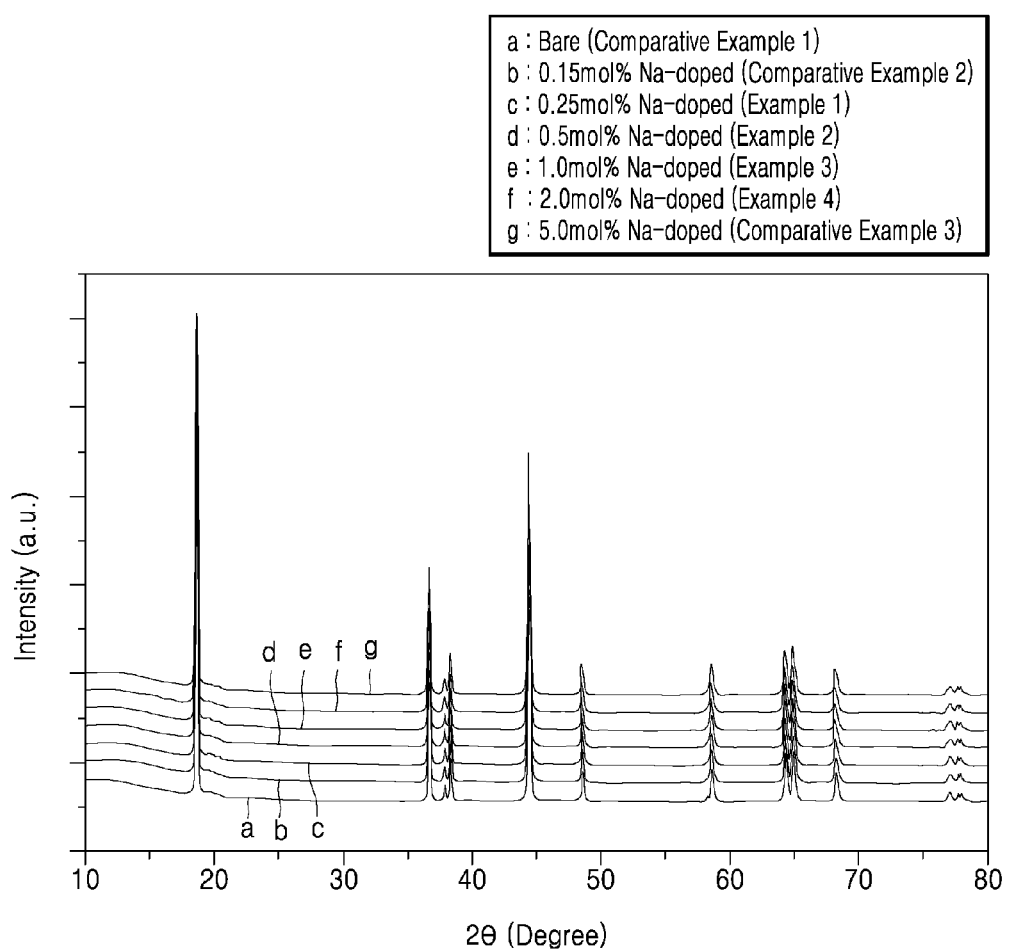
FIG. 3 is a graph illustrating the results of X-ray diffraction analysis on positive active materials of Examples 1 to 4 and Comparative Examples 1 to 3.

The XRD analysis results are shown in FIG. 3.

Referring to FIG. 3, the positive active materials of Examples 1-4 were found to have a major peak at a 2θ of about 18° to about 19° and a minor peak at a 2θ of about 45°.

Lattice constants of the positive active materials of Examples 1 to 4 and Comparative Examples 1 to 3 were obtained based on the XRD analysis results. The lattice constants are shown in Table 3.

TABLE 3

| Example | Amount of Na (mole %) | a (Å) | c (Å) | c/a |
|---|---|---|---|---|
| Comparative Example 1 | 0 | 2.8717 | 14.2432 | 4.9598 |
| Comparative Example 2 | 0.15 | 2.8715 | 14.2428 | 4.9600 |
| Example 1 | 0.25 | 2.8713 | 14.2449 | 4.9611 |
| Example 2 | 0.5 | 2.8714 | 14.2456 | 4.9612 |
| Example 3 | 1.0 | 2.8732 | 14.2523 | 4.9604 |
| Example 4 | 2.0 | 2.8714 | 14.2434 | 4.9604 |
| Comparative Example 3 | 5.0 | 2.8717 | 14.2422 | 4.9595 |

Referring to Table 3, the positive active materials of Examples 1 to 4 were surprisingly found to have a lattice constant ratio (c/a) of about 4.9596 to about 4.9611.

As described above, according to the one or more of the above embodiments of the present disclosure, a positive active material represented by Formula 1 may be structurally stable, and a lithium secondary battery with improved initial efficiency, improved rate capability, and improved lifetime characteristics may be manufactured using a positive electrode including the positive active material of Formula 1.

It should be understood that the exemplary embodiments described herein should be considered in a descriptive sense only and not for purposes of limitation. Descriptions of features or aspects within each embodiment should typically be considered as available for other similar features or aspects in other embodiments.

In the present disclosure, the terms "Example," "Comparative Example," "Manufacture Example", "Comparative Manufacture Example," and "Evaluation Example" are used arbitrarily to simply identify a particular example or experimentation and should not be interpreted as admission of prior art. While one or more embodiments of the present disclosure have been described with reference to the figures, it will be understood by those of ordinary skill in the art that various changes in form and details may be made therein without departing from the spirit and scope of the present disclosure as defined by the following claims.

What is claimed is:

1. A positive active material:
wherein the positive active material is selected from
$Li_{0.9975}Na_{0.0025}Ni_{0.5}Co_{0.2}Mn_{0.3}O_2$,
$Li_{0.9950}Na_{0.0050}Ni_{0.5}Co_{0.2}Mn_{0.3}O_2$,
$Li_{0.99}Na_{0.01}Ni_{0.5}Co_{0.2}Mn_{0.3}O_2$,
$Li_{0.98}Na_{0.02}Ni_{0.5}Co_{0.2}Mn_{0.3}O_2$,
$Li_{0.9975}K_{0.0025}Ni_{0.5}Co_{0.2}Mn_{0.3}O_2$,
$Li_{0.9950}K_{0.0050}Ni_{0.5}Co_{0.2}Mn_{0.3}O_2$,
$Li_{0.99}K_{0.01}Ni_{0.5}Co_{0.2}Mn_{0.3}O_2$,
$Li_{0.98}K_{0.02}Ni_{0.5}Co_{0.2}Mn_{0.3}O_2$,
$Li_{0.9975}Na_{0.0025}Ni_{0.6}Co_{0.2}Mn_{0.2}O_2$,
$Li_{0.995}Na_{0.005}Ni_{0.6}Co_{0.2}Mn_{0.2}O_2$,
$Li_{0.99}Na_{0.01}Ni_{0.6}Co_{0.2}Mn_{0.2}O_2$,
$Li_{0.98}Na_{0.02}Ni_{0.6}Co_{0.2}Mn_{0.2}O_2$,
$Li_{0.9975}Na_{0.0025}Ni_{0.8}Co_{0.1}Mn_{0.1}O_2$,
$Li_{0.995}Na_{0.005}Ni_{0.8}Co_{0.1}Mn_{0.1}O_2$,
$Li_{0.99}Na_{0.01}Ni_{0.8}Co_{0.1}Mn_{0.1}O_2$, and
$Li_{0.98}Na_{0.02}Ni_{0.8}Co_{0.1}Mn_{0.1}O_2$.

2. The positive active material of claim 1, wherein the positive active material is selected from
$Li_{0.9975}Na_{0.0025}Ni_{0.5}Co_{0.2}Mn_{0.3}O_2$,
$Li_{0.9950}Na_{0.0050}Ni_{0.5}Co_{0.2}Mn_{0.3}O_2$,
$Li_{0.99}Na_{0.01}Ni_{0.5}Co_{0.2}Mn_{0.3}O_2$,
$Li_{0.98}Na_{0.02}Ni_{0.5}Co_{0.2}Mn_{0.3}O_2$,
$Li_{0.9975}K_{0.0025}Ni_{0.5}Co_{0.2}Mn_{0.3}O_2$,
$Li_{0.9950}K_{0.0050}Ni_{0.5}Co_{0.2}Mn_{0.3}O_2$,
$Li_{0.99}K_{0.01}Ni_{0.5}Co_{0.2}Mn_{0.3}O_2$,
$Li_{0.98}K_{0.02}Ni_{0.5}Co_{0.2}Mn_{0.3}O_2$,
$Li_{0.9975}Na_{0.0025}Ni_{0.6}Co_{0.2}Mn_{0.2}O_2$,
$Li_{0.995}Na_{0.005}Ni_{0.6}Co_{0.2}Mn_{0.2}O_2$,
$Li_{0.99}Na_{0.01}Ni_{0.6}Co_{0.2}Mn_{0.2}O_2$,
$Li_{0.98}Na_{0.02}Ni_{0.6}Co_{0.2}Mn_{0.2}O_2$,
$Li_{0.9975}Na_{0.0025}Ni_{0.8}Co_{0.1}Mn_{0.1}O_2$,
$Li_{0.995}Na_{0.005}Ni_{0.8}Co_{0.1}Mn_{0.1}O_2$, and
$Li_{0.98}Na_{0.02}Ni_{0.8}Co_{0.1}Mn_{0.1}O_2$.

3. The positive active material of claim 1, wherein the positive active material has a ratio (c/a) of lattice constants c to a, of about 4.9604 to about 4.9612, in X-ray diffraction spectra obtained with Cu-kα radiation.

4. The positive active material of claim 1, wherein the positive active material exhibits diffraction peaks at a Bragg's angle 2θ of about 18° to about 21° and at a 2θ of about 42° to about 47° in X-ray diffraction spectra obtained with Cu-kα radiation.

5. The positive active material of claim 1, wherein the positive active material has a lattice constant a of about 2.8715 to about 2.8732 and a lattice constant c of about 14.2428 to about 14.2456, as measured by X-ray diffraction spectra obtained with Cu-kα radiation.

6. The positive active material of claim 1, wherein the positive active material comprises a coating layer on a surface thereof, the coating layer comprising at least one selected from a conductive material, a metal oxide, and an inorganic fluoride.

7. A lithium secondary battery comprising a positive electrode that includes the positive active material of claim 1.

8. A lithium secondary battery of claim 7, further comprising the positive active material wherein, the positive active material is selected from
$Li_{0.9975}Na_{0.0025}Ni_{0.5}Co_{0.2}Mn_{0.3}O_2$,
$Li_{0.9950}Na_{0.0050}Ni_{0.5}Co_{0.2}Mn_{0.3}O_2$,
$Li_{0.99}Na_{0.01}Ni_{0.5}Co_{0.2}Mn_{0.3}O_2$,
$Li_{0.98}Na_{0.02}Ni_{0.5}Co_{0.2}Mn_{0.3}O_2$,
$Li_{0.9975}K_{0.0025}Ni_{0.5}Co_{0.2}Mn_{0.3}O_2$,
$Li_{0.9950}K_{0.0050}Ni_{0.5}Co_{0.2}Mn_{0.3}O_2$,
$Li_{0.99}K_{0.01}Ni_{0.5}Co_{0.2}Mn_{0.3}O_2$,
$Li_{0.98}K_{0.02}Ni_{0.5}Co_{0.2}Mn_{0.3}O_2$,
$Li_{0.9975}Na_{0.0025}Ni_{0.6}Co_{0.2}Mn_{0.2}O_2$,
$Li_{0.995}Na_{0.005}Ni_{0.6}Co_{0.2}Mn_{0.2}O_2$,
$Li_{0.99}Na_{0.01}Ni_{0.6}Co_{0.2}Mn_{0.2}O_2$,
$Li_{0.98}Na_{0.02}Ni_{0.6}Co_{0.2}Mn_{0.2}O_2$,
$Li_{0.9975}Na_{0.0025}Ni_{0.8}Co_{0.1}Mn_{0.1}O_2$,
$Li_{0.995}Na_{0.005}Ni_{0.8}Co_{0.1}Mn_{0.1}O_2$, and
$Li_{0.98}Na_{0.02}Ni_{0.8}Co_{0.1}Mn_{0.1}O_2$.

9. A lithium secondary battery of claim 7, further comprising the positive active material wherein, the positive active material has a ratio (c/a) of lattice constants c to a, of about 4.9604 to about 4.9612, in X-ray diffraction spectra obtained with Cu-kα radiation.

10. A lithium secondary battery of claim 7, further comprising the positive active material wherein, the positive active material exhibits diffraction peaks at a Bragg's angle 2θ of about 18° to about 21° and at a 2θ of about 42° to about 47° in X-ray diffraction spectra obtained with Cu-kα radiation.

11. A lithium secondary battery of claim 7, further comprising the positive active material wherein, the positive active material has a lattice constant a of about 2.8715 to about 2.8732 and a lattice constant c of about 14.2428 to about 14.2456, as measured by X-ray diffraction spectra obtained with Cu-kα radiation.

12. A lithium secondary battery of claim 7, further comprising the positive active material wherein the positive active material comprises a coating layer on a surface thereof, the coating layer comprising at least one selected from a conductive material, a metal oxide, and an inorganic fluoride.

* * * * *